Nov. 6, 1956 F. W. OLSON, JR 2,769,395
LEAK DETECTOR AND PUMP CONTROL SYSTEM
Filed April 2, 1954 2 Sheets-Sheet 1

INVENTOR.
F. W. OLSON, JR.
BY
Hudson & Young
ATTORNEYS

Nov. 6, 1956  F. W. OLSON, JR  2,769,395
LEAK DETECTOR AND PUMP CONTROL SYSTEM
Filed April 2, 1954  2 Sheets-Sheet 2

INVENTOR.
F. W. OLSON, JR.
BY
ATTORNEYS

United States Patent Office 2,769,395
Patented Nov. 6, 1956

2,769,395

LEAK DETECTOR AND PUMP CONTROL SYSTEM

Frank W. Olson, Jr., Bartlesville, Okla., assignor to Phillips Petroleum Company, a corporation of Delaware Application April 2, 1954, Serial No. 420,725

2 Claims. (Cl. 103—12)

This invention relates to the control of means containing a fluid and having a seal against leakage of said fluid. In one of its aspects the invention relates to the provision of a means, which collects a fluid, leaking through a seal upon, for example, an unattended pump in an oil field, discharges said fluid at a predetermined rate correlated with a maximum desirable or tolerable leakage of said fluid, which accumulates the remainder of leakage and which translates any predetermined quantity of accumulated leakage into an action upon said pump means containing said fluid. In another of its aspects the invention is concerned with a shut-down device which is caused to operate responsive to the accumulation of a liquid and/or a vapor in a means which collects a fluid as above set forth and more fully described herein. More specifically the invention relates to an automatic shut-down device for use with a pipe-line pump, said device operating to stop said pump when leakage of the pumped product exceeds a predetermined amount. Other aspects of the invention and its several related particulars are evident from a perusal of this disclosure, the drawings, and the appended claims.

It is known that there are often found in industries mechanisms for storing or conveying fluids which are subject to developing leaks or which for one reason or another are leaking or leak from time to time. Leakages, as contemplated herein, often occur in connection with packing glands upon valves or pumps, etc.

According to the present invention there has been provided a shut-down device for an energized mechanism containing a fluid, adapted to shut down said mechanism whenever leakage therefrom becomes excessive, said device comprising in combination a fluid-collector means, adapted to collect fluid leaking from said mechanism, said collector having a fluid discharge means adapted to discharge fluid therefrom at a determined fixed rate, and means responsive to the accumulation of fluid in said collector operatively connected to said shut-down device so as to shut down said energized mechanism whenever the fluid in said collector exceeds a predetermined quantity.

Figure 1:
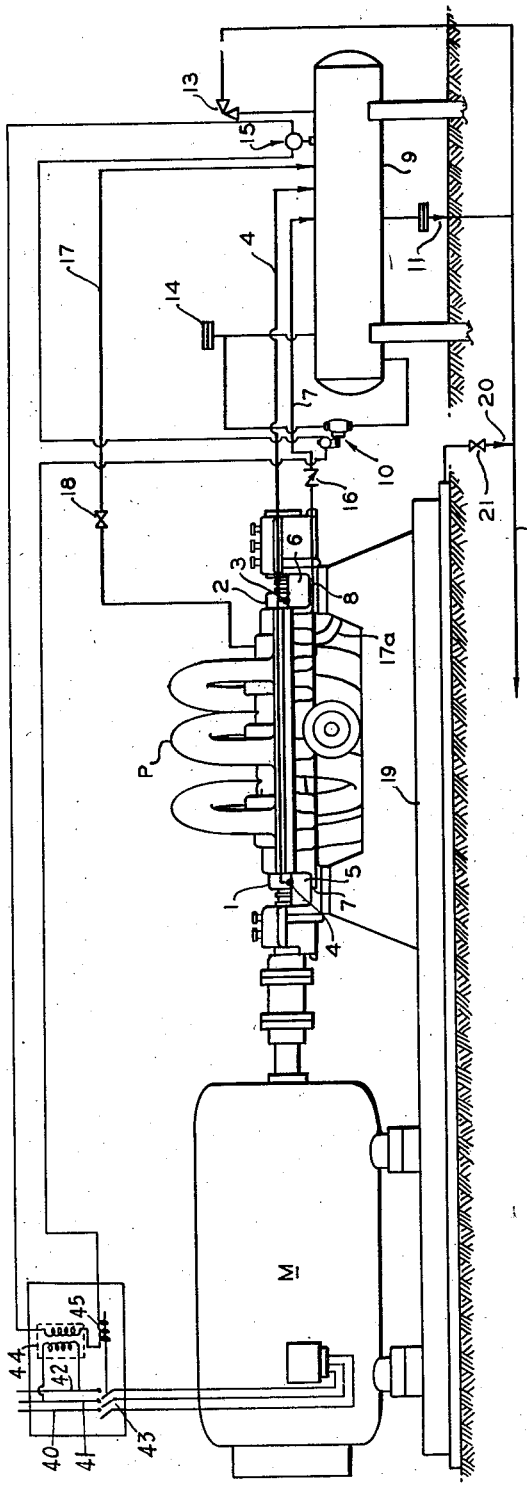

Figure 1 is an elevational view of an embodiment of the invention in which is shown a motor, a pump driven by said motor and a tank or collector means suitably piped and equipped for operation of provided switches whenever the leakage from the pump shaft seals exceeds a predetermined amount.

Figure 3:
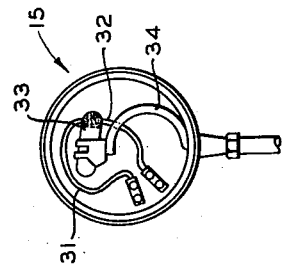
Figure 2:
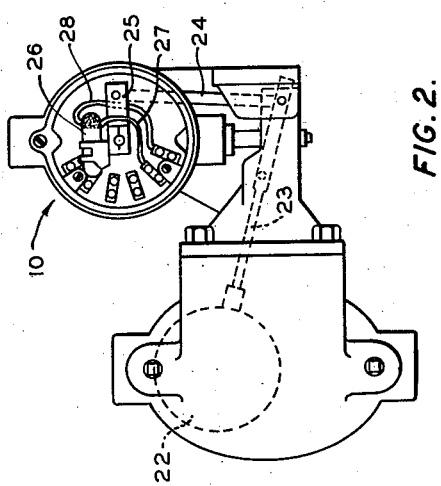
Figure 4:
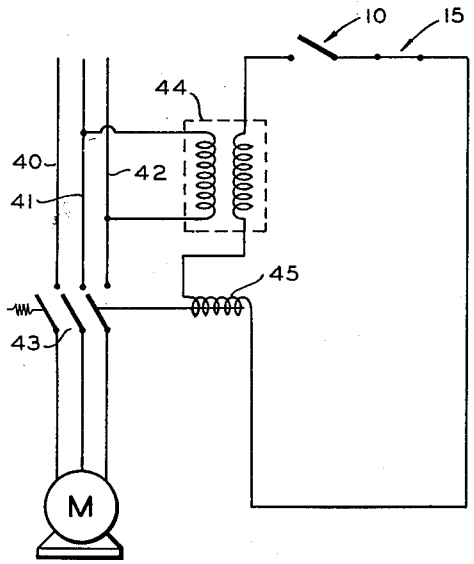
Figure 5:
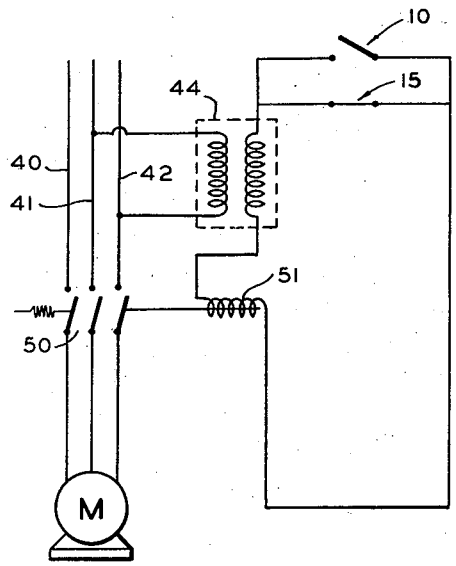
Figure 6:
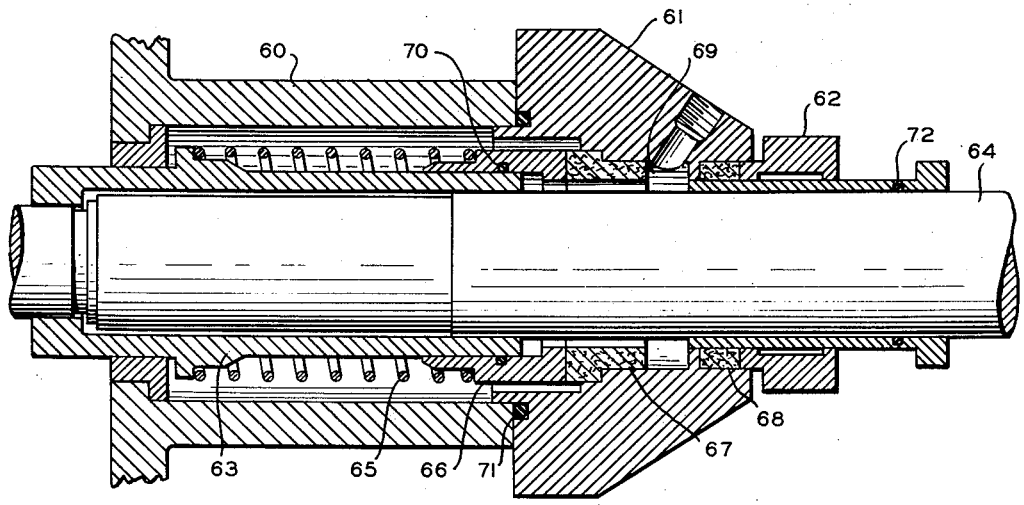

Figure 2 is an elevational view, partly in cross-section, of a float operated mercury switch responsive to the level of liquid which can exist in the tank of Figure 1. Figure 3 is an elevational view of the internals of a pressure actuated mercury switch mounted upon a Bourdon tube. Figures 4 and 5 are wiring diagrams showing how shut-down switches can be made to actuate a switch upon the electrical current supply to an electric motor, for example, the motor of Figure 1. Figure 6 is a sectional view of a shaft seal and housing suitable for use on the pump illustrated in Figure 1.

Referring now to Figure 1, M is an electric motor operating a pump P. The major portion of the leakage through the shaft seals accumulates in shaft seal housings 1 and 2 and flows through conduits 3 and 4 into closed vessel 9. Some may escape the outer seals of housings 1 and 2 and this liquid is collected in pots 5 and 6 and is piped to vessel 9 via conduits 7 and 8. A check-valve 16 is provided in conduit 7. This valve will close upon pressure increase in pipes 3 and 4 and in vessel 9. To provide for a predetermined flow of fluid from vessel 9 it is provided with a discharge orifice 11. Vessel 9 is also provided with float controlled switch 10 and pressure actuated switch 15. Accumulation of liquid will actuate switch 10. This switch is placed in the electric current supply circuit, as shown in Figures 4 and 5 to cut off the flow of electrical current whenever the accumulation of leakage is in excess of the predetermined maximum. To insure proper operation of tank 9, it is provided with emergency relief valve 13 and pipe 12 to carry to sump any overflow of liquid and with excess flow valve 14 to allow air to enter and to leave the tank when it is operating upon a liquid. The apparatus operates in the manner described above when the liquid being pumped is relatively non-volatile. However, when a high vapor pressure product is being pumped, it is possible that even though a large amount of liquid leaks past the pump shaft seal, this liquid may evaporate so rapidly that no appreciable build-up of liquid occurs in tank 9 and switch 10 is inoperative. In this instance excess flow valve 14 closes due to a high rate of flow of gas from tank 9, and the pressure within this tank increases. The increase of pressure actuates pressure switch 15 which, as illustrated in Figures 4 and 5, causes the power supply to motor M to be interrupted, thus stopping pump P. A connection from pump base 19 by way of conduit 20 and valve 21 to sump pipe 12 is provided to draw off any liquid collecting on the pump base. Valve 21 is preferably a check-vale to prevent back flow of liquid from pipe 12.

For purposes of testing, there are provided conduit 17 which includes valve 18. Conduit 17 communicates with pump section 17a by a connection (not shown). Thus, by opening valve 18 the pressure from the pumping system can be bled into the apparatus already described to insure that it is in proper working order.

Figure 2 illustrates float operated control switch 10 in more detail. This device comprises a float 22 connected by pivoted levers 23, 24 and 25 with mercury switch 26. When float 22 is raised to its upper position (as illustrated), mercury switch 26 is tilted and completes a circuit through wires 27 and 28. If desired, mercury switch 26 can be mounted in the reverse position so that the circuit is completed when float 22 is in the lower position and is broken when the float is raised to the position shown.

Figure 3 shows one possible construction for pressure switch 15, including a Bourdon tube 34, a mercury switch 33 and wires 31 and 32. This switch is illustrated in its high pressure position with mercury switch 33 tilted so that it completes the circuit from wire 31 to wire 32. Switch 33 also can be reversed to allow it to complete the circuit under low pressure and break the circuit under high pressure.

Figure 4 illustrates a schematic wiring diagram of one possible modification. Conductors 40, 41, and 42 comprising a high voltage 3-phase source of electrical energy, are connected through normally open switch 43 to motor M. A transformer 44, connected across conductors 41 and 42, supplies a voltage to a control circuit including switch 10, switch 15 and the solenoid winding 45 for operating switch 43. For use in this circuit switch 10 and switch 15 both should be the type which are normally closed but which open upon the application of a high liquid level or a high pressure respectively. Thus, in normal operation, both of these switches are closed and switch 43 is closed supplying power to motor M. However, if either switch 10 or switch 15 opens, the circuit to solenoid winding 44 is broken and switch 43 opens.

In Figure 5, the same conductors 40, 41 and 42 are connected to motor M but a switch 50 replaces switch 43 and switches 10 and 15 are connected in parallel rather than in series. Switch 50 is a normally closed switch and switches 10 and 15 are the type illustrated in Figures 2 and 3, respectively. In normal operation both switch 10 and switch 15 are open and switch 50 is closed to allow current to flow to motor M. However, when either switch 10 or switch 15 closes, the circuit is completed to winding 51 of switch 50 thus opening this switch to break the circuit to motor M. Obviously, other controls normally used with pumps can also be included in the circuits illustrated in Figures 4 and 5 but have been eliminated in these drawings for clarity.

Figure 6 illustrates a mechanical seal which can be used at 1 and 2 in Figure 1. This seal includes housing 60, cap 61, and gland 62. A sleeve 63 is fitted on shaft 64 and maintains a spring 65 in contact with rotary seal 66, which is slidable on sleeve 63 and cooperates with stationary seal ring 67 to form a rotating seal. Gland 62 compresses a packing 68 and forms a secondary seal, which encloses annular chamber 69 which is in communication with pipes 3 or 4. Stationary seals are provided at 70, 71 and 72. Such a mechanical seal as the one illustrated in Figure 6 can be obtained commercially.

The present invention is particularly applicable to the operation of pipe lines which in many cases are provided with automatic, unattended pumping stations. In such instances, it is extremely important that shut-down control equipment be installed to protect the station in various emergencies. Among the items which must be considered is leakage from various parts of the installation particularly through the shaft seals of pumps.

It will be obvious to one skilled in the art that flow through orifice 11 will depend at least in part upon the pressure differential across the same whether due to depth of liquid in tank 9 and/or to vapor pressure therein. Herein and in the claims it will be understood that "predetermined rate" includes fixed as well as variable rates and that "variable rates" includes variations due to liquid and/or vapor pressure as just discussed.

The device of the present invention is applicable to shutting down an energized mechanism whenever any leakage occurs and to this end, orifice 11 and/or excess flow valve 14 are closed off, thus retaining any leakage which upon accumulation will shut off the energy source.

Reasonable variation and modification are possible within the scope of the foregoing disclosure, drawings and the appended claims to the invention the essence of which is that there has been provided in combination with a shut-down device for an energized mechanism containing a fluid, and having a place at which leakage of said fluid therefrom can occur, a fluid collector means, adapted to collect any fluid leaking from said container, said collector having a fluid discharge means, adapted to discharge fluid therefrom at a predetermined fixed rate, and means responsive to the accumulation of fluid in said collector operatively connected to said shut-down device so as to shut down said energized mechanism whenever the fluid in said collector exceeds a predetermined quantity, and further, that said fluid can be either liquid, vaporous or a high vapor pressure liquid.

I claim:

1. In combination with a shut-down device for a fluid moving means moving a fluid, and from which leakage of said fluid can occur, a vessel to collect fluid leaking from said moving means; means for conveying leaked fluid from said fluid moving means to said vessel; said vessel having a fluid discharge means adapted to discharge fluid therefrom at a predetermined rate to remove from said vessel fluid resulting from normal leakage; said vessel having also means responsive to the accumulation of said fluid operatively connected to said shut-down device so as to operate said device whenever the fluid in said vessel exceeds a predetermined quantity; said means responsive to the accumulation of said fluid being a pressure-actuated control upon a power source supplying power to said fluid moving means; said vessel also having a vapor vent allowing flow of atmosphere outside of said vessel into said vessel but being so constructed and arranged as to prevent outward flow of vapors, from within said vessel, above a predetermined vapor flow rate therethrough.

2. In combination with a shut-down device for a fluid moving means moving a fluid having an appreciable vapor pressure, from which moving means leakage of said fluid can occur, a fluid collector means adapted to collect fluid which has leaked from said moving means, means for conveying leaked fluid from said moving means into said fluid collector, a liquid drain means operatively connected with said fluid collector, vapor venting means operatively connected with said fluid collector, said liquid drain means being adapted to drain liquid from said fluid collector at a predetermined rate to remove from said fluid collector liquid resulting from normal leakage, said vapor venting means for venting vapor from said fluid collector being so constructed and arranged as to allow flow therethrough into said fluid collector but to prevent outward flow of vapors, from within said collector, above a predetermined rate of outward vapor flow therethrough, means responsive to the accumulation of liquid in said collector operatively connected to said shut-down device so as to shut down said fluid moving means whenever the liquid accumulation in said fluid collector exceeds a predetermined amount, means responsive to the pressure within said collector operatively connected to said shut-down device so as to shut down said fluid moving means whenever the pressure in said collector exceeds a predetermined value.

References Cited in the file of this patent

UNITED STATES PATENTS

| | | |
|---|---|---|
| 776,521 | Levin | Dec. 6, 1904 |
| 1,698,693 | Durdin | Jan. 8, 1929 |
| 2,239,270 | Jahreis | Apr. 22, 1941 |